United States Patent [19]

Butler

[11] 4,359,297
[45] Nov. 16, 1982

[54] DIKE IRRIGATION

[76] Inventor: Carl E. Butler, P.O. Box 116, Anton, Tex. 79613

[21] Appl. No.: 195,663

[22] Filed: Oct. 9, 1980

[51] Int. Cl.³ .............................................. E02B 13/00
[52] U.S. Cl. .................................... 405/36; 239/145; 239/289; 405/51
[58] Field of Search ................................... 405/36–43, 405/45–51; 239/145, 286

[56] References Cited

U.S. PATENT DOCUMENTS

| | | | |
|---|---|---|---|
| 986,003 | 3/1911 | Hohenstein | 405/43 X |
| 1,526,642 | 2/1925 | Nissley | 239/286 X |
| 2,174,600 | 10/1939 | Schutmaat | |
| 2,918,800 | 12/1959 | Ford | 405/37 |
| 3,315,895 | 4/1967 | Klingbeil et al. | 239/145 |
| 3,374,955 | 3/1968 | Hester | 239/145 |

FOREIGN PATENT DOCUMENTS 348102  1/1922  Fed. Rep. of Germany ...... 239/286

*Primary Examiner*—Dennis L. Taylor
*Attorney, Agent, or Firm*—Wendell Coffee

[57] ABSTRACT

A furrowed irrigated field is diked and water is applied to the furrows. The water is prevented from running down the furrows by the dikes and therefore stays in the approximate location where applied. The water is applied to the furrows from an elevated pipe at right angles to the furrows. The pipe moves along the furrows. At each furrow to be irrigated, a drop pipe extends downward, terminating a short distance above the ground. A sock or flexible drop hose is attached to the end of the drop pipe. The hose drags along the ground so that there is a minimum of erosion to the soil or evaporation of the applied water.

14 Claims, 4 Drawing Figures

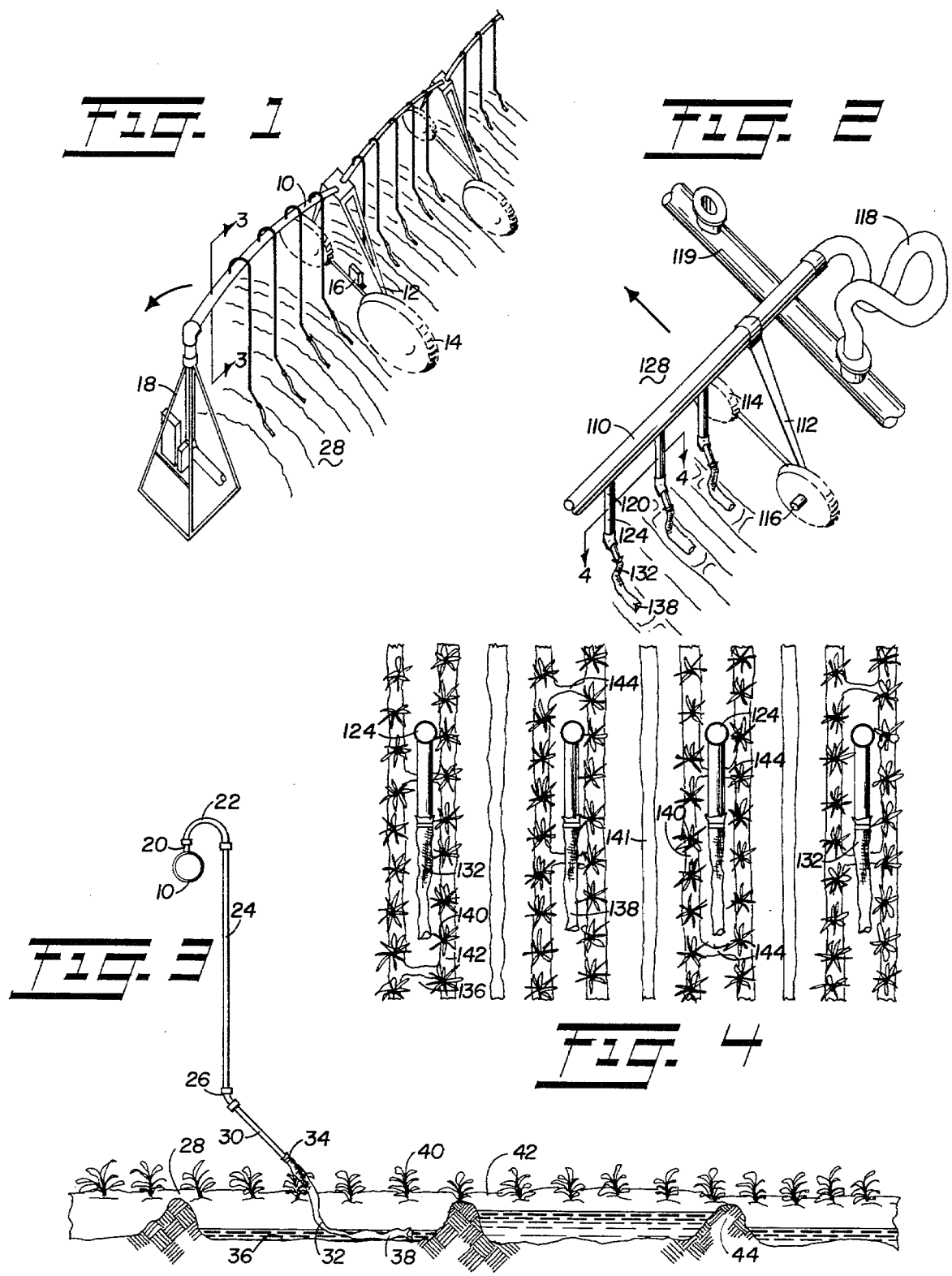

DIKE IRRIGATION

BACKGROUND OF THE INVENTION (1) Field of the Invention

This invention relates to agricultural irrigation and more particularly to applying water to the land from a pipe which moves, as it waters, laterally of its length.

(2) Description of the Prior Art

In commercial practice today agricultural fields are often watered by sprinkling from a moving pipe. Most of these irrigation systems are center pivot type. The water is sprinkled from the pipes which constantly move as they irrigate.

Certain irrigation devices have discharged water through socks or soakers. For example, SCHEUTMAAT, U.S. Pat. No. 2,174,600.

LANNINGER, German Pat. No. 348102, discloses irrigation system having a discharge close to the ground.

SUMMARY OF THE INVENTION

New and Different Function

I have discovered that water can be applied to land much more efficiently by running the water through a sock or short flexible hose directly into the furrow to be watered. There is less evaporation than if the water is sprinkled on the ground. There is also less power required because the only pressure required on the water is for even distribution from the pipe. The water is evenly distributed especially if the land to be irrigated is furrowed and diked. Therefore I achieve a better distribution of water, less evaporation and at less power than by the previous methods of irrigation.

Thus it may be seen that the total function of my invention far exceeds the sum of the functions of the individual elements such as pipes, hoses, valves, etc.

Objects of this Invention

An object of this invention is to irrigate cultivated agricultural land.

Further objects are to achieve the above with a device that is sturdy, compact, durable, lightweight, simple, safe, efficient, versatile, ecologically compatible, energy conserving, and reliable, yet inexpensive and easy to manufacture, install, adjust, operate and maintain.

Other objects are to achieve the above with a method that is versatile, ecologically compatible, energy conserving, rapid, efficient, and inexpensive, and does not require skilled people to install, adjust, operate and maintain.

The specific nature of the invention, as well as other objects, uses, and advantages thereof, will clearly appear from the following description and from the accompanying drawing, the different views of which are not scale drawings.

BRIEF DESCRIPTION OF THE DRAWINGS

FIG. 1 is a perspective view of a portion of a center pivot system embodying this invention.

FIG. 2 is a perspective view of a portion of a lateral system embodying this invention.

FIG. 3 is a sectional view taken on line 3—3 of FIG. 1 showing a side sectional view of the equipment with the diked furrows being watered.

FIG. 4 is a top plan view of the system taken on line 4—4 of FIG. 2 showing the system.

DESCRIPTION OF THE PREFERRED EMBODIMENTS

Referring to FIG. 1 there may be seen a standard center pivot system such as ZIMMATIC manufactured by Lindsay Manufacturing Company, Lindsay, Nebr., a subsidiary of Dekalb Agresearch, Inc. Such a system includes an elongated pipe 10 carrying water. The pipe is supported above the ground by a plurality of vehicles 2, each vehicle having wheel 14. The vehicles 12 will support the pipe 10 a set distance above the land to be watered. There is a move means such as an electric or water motor 16 attached to the vehicles for moving the pipe with the water therein over the land. Supply means such as the center pivot 18 is attached to the pipe for supplying water to the pipe as it moves.

Those having ordinary skill in the art will recognize that the system as described at this point is well known and commercially available on the market.

The system also has a plurality of outlets 20 for discharging the water from the pipe 10. According to my invention an inverted U pipe 22 is attached to the outlet 20 and a drop pipe 24 is attached to the U pipe. The drop pipe terminates at point 26 above the level of the land 28 to be irrigated. There is connected a drop pipe extension 30 which extends at a angle of 135° to the drop pipe 24 and which extends at a 45° angle to the land 28.

Short flexible drop hose 32 is attached to the drop pipe extension 30. It may be seen that the drop pipe extension 30 terminates at a point 34 also above the level of the land 28 to be irrigated. However the length of the drop hose 32 is such that not only it reaches the land to be irrigated and the bottom 36 of the furrow in the land but also it has a portion 38 which drags along the bottom of the furrow. It may be seen in FIG. 1 for the drop hose 32 to drag along the furrow that it is necessary for the land to be plowed in a circle. That is to say the furrows each have circular configuration having the center pivot 18 as their center. The system is well adapted for irrigating fields having a growing crop 40 growing on top of the beds 42 between the furrows with bottoms 36.

To prevent the water from evaporating or running at a distance from where it is placed, dikes 44 are formed along within the furrows. Equipment for forming the dikes is well known. Normally the dikes will be placed at a spacing of about 2 or 3 times the furrow spacing. That is to say that if the furrows are spaced 40 inches apart that the dikes would be spaced about 80 inches or 120 inches apart. This spacing may vary. However I have found it desirable that the spacing for the dikes be no more than 6 times the furrow spacing. That is to say if the furrows are 40 inches apart, the dikes should be no more than 20 feet apart.

This system is particularly adapted for supplemental irrigation for crops grown in semi-arid land. In areas where there is sufficient rainfall to support a minimum crop, this system is good to provide additional water so that a superior crop may be grown. Normally in such areas the crops are planted in a spaced pattern, Normally there are two rows of planted crop and one or two rows skipped. In such instances the land is watered only in the furrow between the two planted rows. That is to say that the drop pipes 24 would be spaced only in every third furrow if the crop were planted two in and one out (two rows planted, one row skipped) or they would be spaced only in every fourth furrow if it were planted two in, two out.

FIGS. 2 and 4 show a embodiment of this invention attached to a lateral move system with straight rows. That is to say that FIG. 2 shows a system having an elongated pipe 110 supported by a plurality of vehicles 112 each having wheels 114. Only one vehicle has been shown in FIG. 2, but those with skill in the art will understand that there would be a plurality of vehicles. Also the vehicles as shown in FIG. 2 would have a move means 116 attached to the vehicle for moving pipe 110 over the land to be irrigated. Supply means in the form of a supply hose 118 having one end attached to the supply pipe 119 and the other with the elongated elevated pipe 110 supplies water to the elevated elongated pipe 110 as it moves.

Again, those familiar with the system will understand that the embodiment as shown in FIG. 2 as described to this point, is old and commercially available on the market from, for example, Zimmatic by Lindsay Manufacturing Company, supra. To this standard system drop pipes 124 are attached to outlet nipples 120 depending from the elevated elongated pipe 110. On bottom of each of the drop pipes is connected the flexible drop hose 132.

As with the previous embodiment the drop pipe 124 will terminate at a point 134 above the land 28 to be watered and the drop hose will have a portion 138 which drags in the bottom 136 of the furrows between beds 142 having growing plants 140 thereon. As previously indicated there will be additional beds 141 not having a plant growing thereon in a two in, one out planted pattern. There will be drop pipes and drop hoses only between the two rows or beds 142 having plants 140 growing thereon. The furrows of FIG. 4 also show the dikes 144 therein. These dikes will not necessarily be exactly spaced, as are the furrows. However the spacing between the dikes will be less than six times the row spacing and more generally about two or three times the furrow spacing.

As may be seen in both instances the elongated pipe is at right angles to the rows and furrows to be irrigated. Of course in the embodiment shown in FIG. 1, the elongated pipe revolves around the center pivot, but it is also at right angles to the row and it moves laterally or along the row. This is certainly true of the embodiment shown in FIG. 2. That is to say that the elongated elevated pipe is at right angles to the row, that the movement is laterally of the pipe along the row. Water is discharged from the open terminal end of the drag hose 32 and 132.

As an aid to correlating the terms of the claims to the exemplary drawing, the following catalog of elements is provided:

| 10 | 110 | elongated pipe |
| 12 | 112 | vehicles |
| 14 | 114 | wheel |
| 16 | 116 | move means |
| 18 | 118 | supply means |
| — | 119 | supply pipe |
| 20 | 120 | outlets |
| 22 | — | u pipe |
| 24 | 124 | drop pipe |
| 26 | — | terminal point |
| 28 | — | land |
| 30 | — | external pipe |
| 32 | 132 | drop hose |

-continued

| 34 | 134 | terminal point |
| 36 | 136 | b. furrow |
| 38 | 138 | drag port |
| 40 | 140 | crop |
| — | 141 | added bed |
| 42 | 142 | bed |
| 44 | 144 | dike |

The embodiments shown and describe above are only exemplary. I do not claim to have invented all the parts, elements or steps described. Various modifications can be made in the proportions, material, arrangement, and operation, and still be within the scope of my invention. The limits of the invention and the bounds of the patent protection are measured by and defined in the following claims. The restrictive description of the specific examples above do not point out what an infringement of this patent would be, but are to enable the reader to make and use the invention.

I claim as my invention:

1. In an agricultural irrigation system for irrigating cultivated land having:
    a. an elongated pipe carrying water therein,
    b. a plurality of vehicles supporting said elongated pipe with water therein a set distance above the land to be watered,
    c. move means attached to the vehicles for moving the pipe with water therein over the land, and
    d. supply means attached to the pipe for supplying water to the pipe as it moves,
  wherein the improved structure comprises:
    e. rigid drop pipes extending down from the elongated pipe, and
    f. a flexible drop hose attached to each of the drop pipes,
    g. the length of the drop pipe and hose such that the drop pipe is above the land and the hose drags on the land being watered.

2. The invention as described in limitations a. through g. of claim 1 wherein said supply means is in the form of a center pivot and the elongated pipe revolves around the center pivot.

3. The invention as described in limitations a. through g. of claim 1 wherein said supply means is in the form of a supply hose connected to the elongated pipe and the move means is for moving the elongated pipe laterally.

4. The invention as described in limitations a. through g. of claim 1 wherein the land has furrows with regular spacing and with dikes in the furrows.

5. The invention as described in limitations a. through g. of claim 4 wherein the elongated pipe is normal to the furrows and the dikes are no further apart than six times the furrow spacing.

6. The invention as described in limitations a. through g. of claim 5 wherein said supply means is in the form of a center pivot and the elongated pipe revolves around the center pivot.

7. The invention as described in limitations a. through g. of claim 5 wherein said supply means is in the form of a supply hose connected to the elongated pipe and the move means is for moving the elongated pipe laterally.

8. The method of irrigating cultivated land including:
    a. supplying water to an elongated pipe,
    b. supporting the elevated pipe a set distance above the land to be watered,
    c. moving the elevated pipe over the land and supplying water to the pipe as it moves;

wherein the improved method comprises:
- d. discharging water from the elevated pipe through hose, and
- e. dragging said hoses along the ground as the pipe moves and the water is discharged therefrom.

9. The invention as described in limitations a. through e. of claim 8 further comprising:
- f. moving the pipe in a circle around a center pivot, and
- g. supplying the water to the pipe through said center pivot.

10. The invention as described in limitations a. through e. of claim 8 further comprising:
- f. supplying the water to the elevated pipe through a hose, and
- g. moving the elevated pipe laterally.

11. The invention as described in limitations a. through e. of claim 8 further comprising:
- f. plowing the land so that it is furrowed, and
- g. diking the furrows before irrigation.

12. The invention as described in limitations a. through g. of claim 11 further comprising:
- h. maintaining the elevated pipe normal to the furrows and
- i. forming the dikes at a spacing no further apart than six times the furrow spacing.

13. The invention as described in limitations a. through i. of claim 12 further comprising:
- j. moving the pipe in a circle around a center pivot, and
- k. supplying the water to the pipe through said center pivot.

14. The invention as described in limitations a. through e. of claim 12 further comprising:
- j. supplying the water to the elevated pipe through a hose, and
- k. moving the elevated pipe laterally.

* * * * *